United States Patent [19]

Shimada

[11] Patent Number: 4,650,251
[45] Date of Patent: Mar. 17, 1987

[54] WELT IN A SEAT AND METHOD OF MAKING SAME

[75] Inventor: Makoto Shimada, Akishima, Japan

[73] Assignee: Tachikawa Spring Co., Ltd., Tokyo, Japan

[21] Appl. No.: 824,967

[22] Filed: Jan. 31, 1986

[30] Foreign Application Priority Data

Jan. 31, 1985 [JP] Japan .................... 60-17524

[51] Int. Cl.[4] .............................................. A47C 7/02
[52] U.S. Cl. ........................... 297/452; 5/474; 29/91.6; 156/73.1; 297/DIG. 2
[58] Field of Search .......... 297/452, DIG. 1, DIG. 2; 5/471, 474, 407, 406; 428/123; 156/73.1, 73.2; 29/91.6

[56] References Cited

U.S. PATENT DOCUMENTS 1,013,401 1/1912 Kindel .................................. 29/91.6
3,075,862 1/1963 Hoyer ............................ 297/DIG. 2
3,535,195 10/1970 Loew .................................. 428/123
3,822,426 7/1974 Mistarz .................................. 5/474
4,561,917 12/1985 Urai .................................. 156/73.1

FOREIGN PATENT DOCUMENTS 0022896 1/1981 European Pat. Off. .......... 156/73.2

Primary Examiner—James T. McCall
Attorney, Agent, or Firm—Cushman, Darby & Cushman

[57] ABSTRACT

A seat for use in an automobile, airplane and house is disclosed and includes a top cover member having a decorative welt therein that is formed in a portion of the top cover member. The top cover member is fixed to the surface of a cushion member formed of foam material. The welt is formed by enveloping the external periphery of a string-shaped welt core member with the top cover member in a Ω-shaped manner using a groove which is formed by mating two molding pieces. Accordingly, the seat according to the invention can be manufactured at lower costs.

7 Claims, 8 Drawing Figures

WELT IN A SEAT AND METHOD OF MAKING SAME

BACKGROUND OF THE INVENTION

1. Field of the Invention

The present invention relates to a seat for use in an automobile, airplane and house, and, more particularly, to a seat having decorative welts in the top cover member thereof which forms the surface of the seat.

2. Description of the Prior Art

Conventionally, seat welts are generally interposed between seat reinforcement or top cover member and gore portions, that is, the sewn portions thereof, and are then sewn there by a sewing machine.

This means that mounting of the welts requires skill, resulting in the high cost of the seat. For this reason, There are signs of development of new methods for attaching the welts without using the machine sewing.

For example, in Japanese Patent Publication No. 95089 of 1984, there is disclosed a method in which upper and lower molds are used to roll a welt core into one end of a gore portion or a top cover member and the welt core is welded by means of high-frequency waves to form a welt.

According to this method, there is eliminated a step of the above-mentioned machine-sewing. The method, however, involves a special operation that, after the roll-in of the welt core, the portions of the gore and top cover members where the welt core is interposed must be mounted in substantially 90 degrees. Also, in this method, the gore portions and the top cover member are formed of different members, respectively.

Also, according to another method which is disclosed in Japanese Patent Publication No. 156372 of 1984, a welt core is inserted into the projection portion of a vacuum-formed trim cover assembly, the undiluted solution of foam synthetic resin such as urethane foam is thereafter injected into the interior of the trim cover assembly, and it is then foamed and cured to unite the welt core, trim cover assembly and a foam cushion member into one so as to form a welt.

In this case, the machine-sewing operation is eliminated and also it becomes easier to form the welt since the welt is not interposed as in the previously-described prior art but it is formed integrally with the trim cover assembly and the foam cushion member. However, this method requires special equipment for vacuum-forming the trim cover assembly as well as the welt. Also, due to the integral formation by means of the foaming and curing operation, a seat produced using this method becomes large in size, is limited in shape, and is thus hard to adapt itself to circumstances.

SUMMARY OF THE INVENTION

The present invention aims at providing a seat which has such welts as eliminate the need of special large-scale equipment and do not limit the shape of the seat, while it avoids the drawbacks found in the prior art seats.

Accordingly, it is an object of the invention to provide a seat which is provided with welts of excellent appearance that can be formed by using simple equipment.

In attaining this object, according to the invention, a welt core member, that is, the external periphery of the welt core member is enveloped with a top cover member in a $\Omega$-shaped manner using a groove formed by a combination of molds to form a welt, and the entire rear or back surface of the top cover member is fixed to a cushion member of foam material by means of fixing means such as an adhesive or the like so as to form the seat.

In other words, the welt core member together with the top cover member is pushed into the groove and is then pressed from both sides by molds so that the top cover member enclosing the welt core member is caused to have the $\Omega$-shaped section. Since a state in which the two sides of the top cover member surrounding the welt core member one round are in touch with each other provides the maximum area of contact between the welt core member and top cover member and thus the friction between these two members is greatest in such state, in this condition, the two members can be connected to each other and the most beautiful welt can be obtained. To keep this condition, while such pressure by the molds is maintained applied to hold the two sides of the $\Omega$-shaped neck portion of the top cover member in contact with each other, the back surface of the top cover member is fixedly secured to the above-mentioned foam cushion member.

It is another object of the invention to provide a seat which can be manufactured in a simplified operation as well as in bulk.

In order to accomplish this object, according to the invention, a single piece of top cover member is used to foam a welt as well as to cover a cushion member so as to produce a seat. Therefore, in the invention, there is no need to sew the top cover member in a predetermined form (for example, to form it in a bag-like form so as to match the external configuration of the cushion member), and the need to sew the welt to the top cover member is also eliminated.

The above and other related objects and features of the invention will be apparent from a reading of the following description of the disclosure found in the accompanying drawings and the novelty thereof pointed out in the appended claims.

DETAILED DESCRIPTION OF PREFERRED EMBODIMENTS OF THE INVENTION

Figure 1:
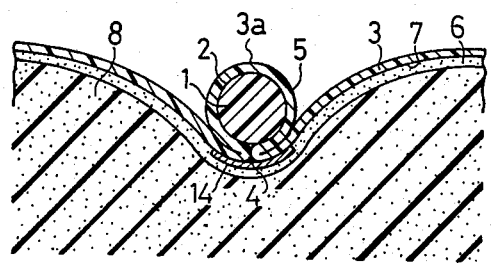
FIG. 1 is a partial section view of an embodiment of the invention.

Referring first to FIG. 1, there is shown a partial section view of an embodiment of the invention. In the drawings, reference numeral (1) designates a string type of welt core member formed of flexible plastic such as polypropylene, polyethylene, vinyl chloride or the like. (2) represents the external periphery of the welt core member and (3) stands for a top cover member which is formed of textile, vinyl leather, textile with back coating, or the like. (3a) denotes a portion of the top cover member (3). The top cover member is formed of a single piece of seamless material and in such a size that it can cover the whole portions of a foam cushion member (8) except the bottom portion thereof. The portion (3a) envelopes the welt core member external periphery (2) and the two sides thereof come in contact with each other at a point of contact (4) from the two sides of the external periphery (2) to form a Ω-shaped configuration so as to form a welt (5).

Numeral (6) designates an adhesive which is used to attach the back surface (7) of the top cover member (3) to a cushion member (8) formed of foam material. With the two sides of the top cover member (3) in contact with each other at the above-mentioned point of contact (4), the top cover member (3) is connected in the lower portion thereof to the foam cushion member (8) via the adhesive (6). As a result of this, the welt core member (1) is pressed hard by the portion (3a) of the top cover member (3), so that it is able to hold its shape as a welt as well as to perform its function. In case of need, a reinforcing cloth (14) may be used to maintain the strength of portions adjacent to the point of contact (4). The illustrated cushion member (8) is mold-formed of urethane foam such that it has a configuration similar to the outside shape of the seat.

According to one aspect of the invention, the welt (5) is integral with the top cover member (3) and it is formed of the portion (3a) of a single piece of top cover member, while it can be manufactured in a simple manner.

Figure 2:
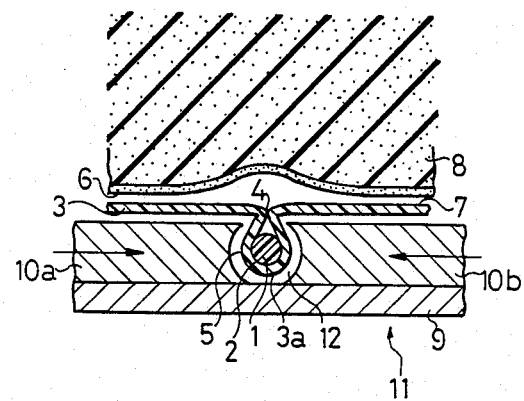
FIG. 2 is an explanatory view of the above embodiment, illustrating equipment for manufacturing the same.

In other words, as shown sectionally in FIG. 2, a molding box (11) comprising a fixing plate (9) and two molding pieces (10a, 10b) is prepared. The two molding pieces (10a, 10b) are spaced properly from each other on the fixing plate (9) with the contact surfaces of the molding pieces (10a, 10b) in contact with each other, so that a groove (12) of a circular section is formed on the fixing plate (9). Then, the single piece of top cover member (3) is placed on the molding box (11) with the top surface of the top cover member (3) faced downward, and the welt core member (1) is pushed into the groove (12) together with the top cover member portion (3a) and is pressed from both sides by the molding pieces (10a, 10b) as shown by arrows so that the external periphery (2) of the welt core member (1) is held closely by the top cover member portion (3a). At the same time, the top cover member (3) provides an inverted Ω-shaped configuration at the opening of the groove (12) with the two sides of the top cover member (3) being in contact with each other at the point of contact (4). In this condition, the foam cushion member (8) is pushed down from above and is attached to the back surface of the top cover member (7) by means of the adhesive (6).

Then, the two molding pieces (10a, 10b) of the molding box (11) are removed and the foam cushion member (8) is pressed from above to prepare the entire form. After then, this assembly is turned over so that such a form as shown in FIG. 1 can be obtained. As can be seen in FIG. 2, the foam cushion member (8) and adhesive (6) are respectively recessed formed in part. This is to match them to the final configuration of the top cover member (3) as shown in FIG. 1.

Figure 3:
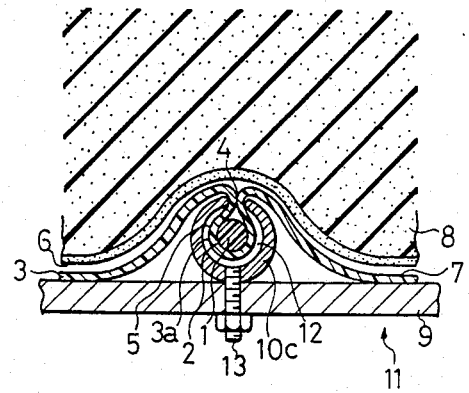
FIG. 3 is an explanatory view of the above embodiment, illustrating another equipment for manufacturing the same.

Referring now to FIG. 3, there is shown a sectional view of another embodiment of the invention.

In this embodiment, there is illustrated a molding box (11) in which a molding piece (10c) formed cylindrically and having a longitudinally extending groove (12) in its upper portion is fixed to the fixing plate (9) with a bolt (13). A single piece of top cover member (3) is placed on the upper portion of the molding box (11) with the top surface thereof being faced downward, and the welt core member (1) is pushed into the groove (12) together with the portion (3a) of the top cover member (3), so that the top cover member portion (3a) is caused to envelope the welt core member (1), the section thereof becomes an inverted Ω-shaped configuration, and thus a welt (5) having two sides in contact with each other at a point is formed. In the illustrated embodiment, the molding piece (10c) has proper elasticity. Therefore, when the welt core member (1) together with the top cover member portion (3a) is pushed into the groove (12), the upper entrance of the groove (12) can be expanded to some degree to facilitate insertion of the welt core member (1) together with the top cover member portion (3a). Also, after insertion, due to the elasticity of the molding piece (11), the top cover member portion (3a) is allowed to enclose and hold the welt core member (1) more closely, and the two sides of the top cover member (3) are maintained in touch with each other at the point of contact (4) in the opening of the groove (12). In this state, when the surface of the foam cushion member (8) is pressed from above onto the molding piece (10c) via the adhesive (6), then the molding piece (10c) is caused to deform in its upper portion due to its elasticity and the top cover member portion (3a) embraces the welt core member (1) still more closely to increase the contact pressure of the contact point (4), so that the back surface (7) of the top cover member (3) is attached to the foam cushion member (8). Thereafter, the welt (5) and the like are removed from the molding box (11) and the resultant assembly is turned over so as to obtain the form as shown in FIG. 1.

Figure 4:
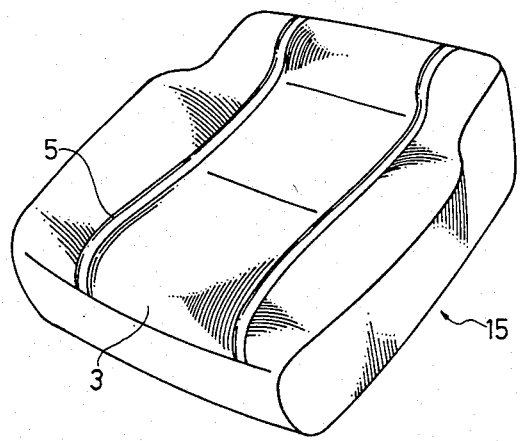
FIG. 4 is a perspective view to illustrate how the above embodiment is used.
Figure 5:
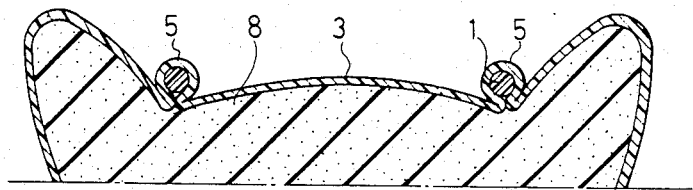
FIG. 5 is a section view of the above embodiment, illustrating how the above-embodiment is used.

Referring now to FIG. 4, there is shown a perspective view to illustrate a condition in which the invention is used; that is, a condition how to use the welt (5) provided in the top cover member (3) of a seat (15). FIG. 5 is a section view of the embodiment of FIG. 4, in which the welt (5) is equipped in a recess of the seat (15) for reinforcement or for decoration and the welt (5) and the top cover member (3) are composed of a single piece of top cover member. The adhesive (6) is actually employed in this case, but it is not shown in FIG. 5.

Although the welts (5) are provided in the recesses of the seat (15) as shown in FIGS. 4 and 5, this is not limitative but they may be positioned in the flat portions of the seat as well.

Figure 6:
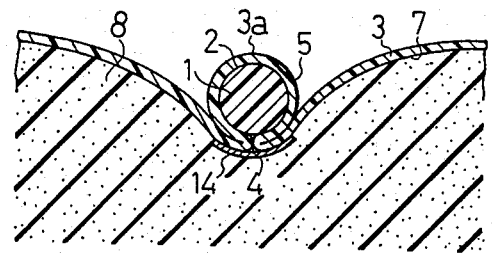
FIG. 6 is a partial section view of another embodiment of the invention in which a top cover member is fixed to a cushion member without using an adhesive; and, FIGS. 7 and 8 are respectively explanatory views of the second embodiment, illustrating equipment for manufacturing the same without using an adhesive.

In FIG. 6, there is illustrated another embodiment of the invention wherein a top cover member (3) is fixed to a cushion member (8) by other fixing means such as high-frequency waves, supersonic waves or the like without using an adhesive (6). Also, the top cover member (3) may be positioned within a mold in which the cushion member (8) is foamed, and may be foamed integrally with the cushion member (8) to be fixed.

Figure 7:
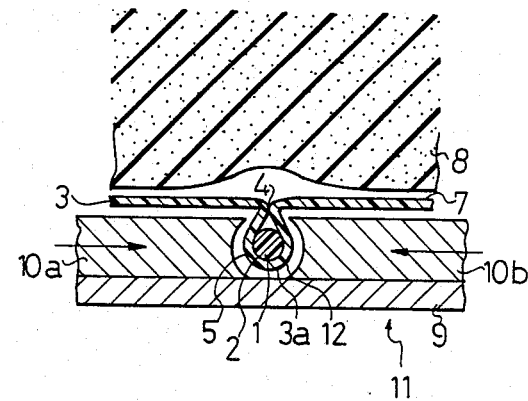

In FIG. 7, there is shown a case where two molding pieces (10a)(10b) are employed as the electrodes of a high frequency welder or the lower molds of a supersonic welder. This case shows that the top cover member (3) may be fixedly secured to the cushion member (8) using the high frequency waves, supersonic waves or the like.

Figure 8:
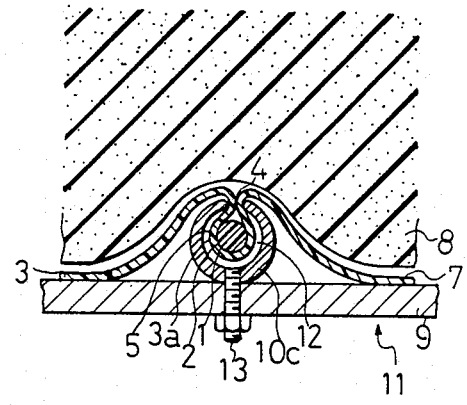

In FIG. 8, there is illustrated equipment which is used to fix the top cover member (3) to the cushion member (8) without using the adhesive (6) as in the case in FIG. 7. That is, in this case, the molding piece (10c) and/or the fixing plate (9) may be used as the lower mold(s) of the high frequency or supersonic welder.

Accordingly, the present invention has the following effects:

(1) It can be produced by a simple molding box so as to reduce the cost thereof;

(2) It requires no advanced technical skill and thus is easy to manufacture;

(3) It can be produced by a single piece of top cover member to eliminate the need for sewing, which simplifies the working process thereof and thus permits the mass production thereof; and, (4) There is no need for specification of the size thereof and it can be produced in various sizes according to demand for highly versatile applications.

What is claimed is:

1. A welt in a seat, comprising:
   a string-shaped welt core member having an external periphery and being independently formed;
   a seamless unitary top cover member having a $\Omega$-shaped portion which encloses the external periphery of said welt core member, said $\Omega$-shaped portion including two opposite foot portions which mutually contact each other at a common contact point; and
   a cushion member having an external surface and being fixedly secured at said external surface to the top cover member.

2. A method of making a welt in a seat, comprising the steps of:
   placing a pair of molding pieces slidably in an opposed relationship with each other, on a fixing plate, said molding pieces respectively having mating portions whose configuration is to form a groove of a substantially circular shape in section when they are mated;
   putting a seamless unitary top cover member on said pair of molding pieces with the surface of said top cover member facing toward said molding pieces while said pair of molding pieces are spaced apart from each other;
   laying an independently formed string-shaped welt core member on said top cover member and inserting said welt core member together with a corresponding portion of said top cover member between said pair of molding pieces;
   mating said pair of molding pieces to form a welt within said groove formed by said pair of molding pieces; and
   fixing a cushion member to said top cover member placed on said pair of molding pieces.

3. A method of making a welt in a seat, comprising the steps of:
   setting a molding body on a fixing plate, said molding body being formed of a cylindrical elastic member and further having a slit extending longitudinally in the upper portion thereof;
   pushing a portion of a seamless unitary top cover member together with an independently formed string-shaped welt core member into said molding body; and
   fixing a cushion member to said top cover member.

4. The welt in a seat as defined in claim 1, wherein said cushion member is integrally formed with said portion of the top cover member enclosing said welt core member.

5. The welt in a seat as defined in claim 1, wherein said welt core member is formed of flexible synthetic resin.

6. The welt in a seat as defined in claim 1, wherein said top cover member is formed of a single unitary piece of seamless material having such a size large enough so as to be able to cover all of the surface of said cushion member except the bottom surface thereof.

7. The welt in a seat as defined in claim 1, further comprising:
   a reinforcing cloth fixedly attached to said top cover member such that the reinforcing cloth is disposed beneath said contact point, thereby preventing separation of the two opposite foot portions from each other.

* * * * *